United States Patent [19]
Tobita et al.

[11] Patent Number: 5,477,738
[45] Date of Patent: * Dec. 26, 1995

[54] MULTI-FUNCTION DIFFERENTIAL PRESSURE SENSOR WITH THIN STATIONARY BASE

[75] Inventors: Tomoyuki Tobita, Katsuta; Yoshimi Yamamoto; Akira Nagasu, both of Ibaraki; Ken'ichi Aoki, Katsuta, all of Japan

[73] Assignee: Hitachi, Ltd., Tokyo, Japan

[ * ] Notice: The portion of the term of this patent subsequent to May 9, 2012, has been disclaimed.

[21] Appl. No.: 870,328

[22] Filed: Apr. 17, 1992

[30] Foreign Application Priority Data

Apr. 22, 1991 [JP] Japan ..................... 3-090289

[51] Int. Cl.$^6$ ................................. G01L 13/02
[52] U.S. Cl. ................... 73/716; 73/708; 73/721
[58] Field of Search ............... 73/721, 720, 726, 73/727, 756, DIG. 4; 338/4

[56] References Cited

U.S. PATENT DOCUMENTS

| | | | |
|---|---|---|---|
| 4,771,639 | 9/1988 | Saigusa et al. | 73/721 |
| 4,798,093 | 1/1989 | Kenoun | 73/708 |
| 4,800,759 | 1/1989 | Hirata et al. | 73/708 |
| 4,813,272 | 3/1989 | Miyazaki et al. | 73/708 |
| 4,972,716 | 11/1990 | Tobita et al. | 73/721 |
| 5,012,677 | 5/1991 | Shimada et al. | 73/721 |
| 5,029,479 | 7/1991 | Bryan | 73/721 |
| 5,062,302 | 11/1991 | Petersen et al. | 73/721 |

Primary Examiner—Richard Chilcot
Assistant Examiner—Joseph L. Felber
Attorney, Agent, or Firm—Antonelli, Terry, Stout & Kraus

[57] ABSTRACT

A multi-function differential pressure sensor includes a semiconductor chip, a stationary base having a joining portion joined to a thick wall portion of the semiconductor chip, and a housing joined to the stationary base. The semiconductor chip is provided with a differential pressure detection unit, a static pressure detection unit, and a temperature detection unit. The joining portion of the stationary base is not thicker than the semiconductor chip. The stationary base has one or more thin wall portions located, in a plan view, within a circular pressure sensitive diaphragm of the semiconductor chip.

4 Claims, 10 Drawing Sheets

FIG. IIA

FIG. IIB

MULTI-FUNCTION DIFFERENTIAL PRESSURE SENSOR WITH THIN STATIONARY BASE

BACKGROUND OF THE INVENTION

The present invention relates to a differential pressure sensor which is suitably used for measuring the differential pressure between two fluids, and particularly but not exclusively relates to a multi-function differential pressure sensor which is capable of measuring a static pressure and a temperature as well as the differential pressure.

In conventional differential pressure sensors, there have been known various kinds of multi-function differential pressure sensors which have differential pressure, static pressure and temperature sensors arranged in one chip for simultaneously detecting a differential pressure, a static pressure and a temperature. Earlier attempts are disclosed in Japanese unexamined patent publication (Kokai Koho) Nos. 61(1986)-240134 and 2(1990)-9704, for example. In either attempt, a differential pressure sensor unit as the main sensor is provided on a thin wall, called a pressure sensitive diaphragm, thereof with four semiconductor resistors which are sensitive to a differential pressure. The differential pressure sensor unit is, moreover, provided on a thick wall portion thereof with several semiconductor resistors which are sensitive to static pressure (line pressure) and temperature. These semiconductor resistors are simultaneously formed in the substrate of the semiconductor according to thermal diffusion or ion implantation of the semiconductor production process. The semiconductor substrate is mounted to a stationary base, which is attached to a housing.

In such a kind of multi-function differential pressure sensor, a zero point shift which is caused by changes in line pressure in a process and in temperature is positively compensated for by using signals of an auxiliary sensor, such as static pressure sensor and temperature sensor, mounted on the sensor for producing high accuracy differential signals.

In the earlier attempts, particularly the attempt of Japanese unexamined patent publication 2-9704, bending strains which are caused by the difference in Young's modulus between the semiconductor substrate and the stationary base in application of a static pressure are positively used. Outputs of the static pressure signals are therefore very small, and only compensation signals which are low in S/N ratio can be produced. Moreover, bending strains are generated to produce static pressure signals, and therefore provide influences to the pressure sensitive diaphragm of the differential pressure sensor, so that differential pressure signals and static pressure signals are interfered with each other. For this reason, to obtain a high accuracy differential pressure signals it is necessary to finely collect input and output characteristics of the differential pressure sensor while the temperature and the static pressure are changed.

In Japanese unexamined patent publication 61-240134, differential pressure and static pressure which are to be detected are detected at respective pressure sensitive portions, and static pressure signals are therefore large as compared to those signals in Japanese unexamined patent publication 2-9704. In Japanese unexamined patent publication 61-240134, to produce signals having a high S/N ratio it is however necessary to provide an induction tube portion for introducing a reference pressure to the rear surface of the pressure sensitive portion for static pressure sensor signals. Such a construction is basically much the same as provision of a new static pressure sensor. Thus, the construction and fabrication of the sensor becomes complicated and the sensor deteriorates in reliability and economy. It is preferable to mount various sensors on a single chip as in Japanese unexamined patent publication 2-9704.

In the multi-function differential pressure sensor of either attempt, attention is mainly paid to the zero point shift during application of static pressure to the differential pressure sensor which is the main strain sensor, and the zero point shift is compensated for using output signals from the static pressure sensor as a parameter. In application of a static pressure to the differential pressure sensor, not only the zero point shift but also a change in span is necessarily produced. The compensation of the span change is very hard to accomplish in the collecting of compensation data as compared to compensation of the zero point shift. This is because a predetermined differential pressure must be produced under application of a static pressure to collect the characteristic of the differential pressure sensor. For this reason, regarding a change in span, no compensation is made or simple compensation is carried out. In the differential pressure sensor as the main strain sensor, from the point of measurement accuracy the change of the span should be regarded as important as compared to the shift of the zero point, but in the earlier attempts previously described the span change is not sufficiently compensated.

SUMMARY OF THE INVENTION

Accordingly, it is an object of the present invention to provide a differential pressure sensor which is capable of producing high accuracy differential signals by reducing shifts of the zero point and the span in a hardware manner.

Another object of the present invention is to provide a multi-function differential pressure sensor which is capable of independently producing differential signals, static pressure signals and temperature signals without interference between them.

A still another object of the present invention is to provide a differential pressure sensor which is fabricated with ease, excellent in economy, and suitable for producing high pressure output signals.

To achieve the first object, according to an aspect of the invention, a differential pressure sensor includes a semiconductor chip having a differential pressure detection means provided thereon, and a stationary base joined to the semiconductor chip to fixedly secure the same, wherein a first pressure is applied to a surface of the semiconductor chip which is on the opposite side to a joint between the semiconductor chip and the stationary base, and a second pressure is applied to another surface of the semiconductor chip on the joint side through a hollow portion which is formed in the stationary base. Further provided is a means for applying the first pressure to a side of the stationary base which is opposite to the joint.

To achieve the second object, according to another aspect of the invention, a multi-function differential pressure sensor includes a single semiconductor chip which has a thin wall portion, a differential pressure detection means provided on the thin wall portion and a static pressure detection means provided on a thick wall portion of the semiconductor chip other than the thin wall portion, and a stationary base which has a joining surface brought into contact with the thick wall portion of the semiconductor chip and a thin wall portion. The joining surface is formed to be equal in thickness or less than a thickness of the semiconductor chip, and the thin wall portion of the stationary base is arranged, as viewed in a plan view, within the thin wall portion of the semiconductor chip on which the differential pressure detection means is situated.

Furthermore, to achieve the other objects, the present invention makes improvements on a shape of the stationary base and a way of joining the semiconductor, the stationary base and a housing to one another, which improvements will be described in detail later.

With the above arrangement according to the first aspect, the joining portion of the stationary base, which is in contact with the semiconductor, functions as an absorber for absorbing strains due to static pressure and heat, and serves also as a pressure acting surface which bears the pressure acting onto the surface of the semiconductor chip. Accordingly, the semiconductor chip is in a state as if it is kept in a static pressure condition, so that strains during application of only a static pressure as well as the zero point shift and the span change can be reduced through the improvement of the structure of the sensor.

The function of the sensor according to the first aspect of the invention as well as that of the sensor according to the second aspect will be more specifically described below. In an embodiment of the invention, the thin wall portion of the semiconductor chip is formed substantially in the center of the semiconductor chip and serves as a pressure sensitive diaphragm which is responsive to a differential pressure. A resistor for differential pressure, constituting the differential pressure detection means, is formed on this diaphragm, and varies in its value of resistance in accordance with the differential pressure applied to the diaphragm. A temperature sensitive resistor, which is responsive to only a temperature, is formed on a thick wall portion of the semiconductor, and changes its resistance in accordance with a temperature change to output a temperature signal. On the other hand, similarly to the temperature sensitive resistor, four resistors for detection of a static pressure are formed on the thick wall portion of the semiconductor. At least two of the static pressure resistors are arranged on a pressure sensitive diaphragm for static pressure, which is newly formed in the same manner as the differential pressure sensitive diaphragm, or on the thick wall portion like the temperature resistor. When a static pressure is applied, in a case where the sensitive diaphragm for static pressure is formed, the static pressure resistors formed on the thick wall portion of the semiconductor change largely in their resistances in accordance with the pressure, or in case where no sensitive diaphragm for static pressure is formed, their resistances change due to a difference between distortions of the stationary base and the semiconductor chip to output a static pressure signal.

A joining portion, which is provided on the stationary base to fixedly secure the semiconductor chip and install the same onto a housing, has at least an area larger than the thick wall portion of the semiconductor chip and is equal in thickness or smaller than the semiconductor chip. The joining portion serves as an absorber for absorbing strains due to static pressure and heat and also as a joining surface for attaining a firm join. The joining portion further functions as a pressure acting surface for making a static pressure condition on the thick wall portion of the semiconductor chip. By these functions, even when only a static pressure is applied, only strains, which shift the strains caused by the static pressure in parallel toward the tension side as they are, are produced on the sensitive diaphragm of the semiconductor chip. The magnitude of each of shifts of the zero point and the span of the differential pressure sensor during application of the static pressure depends on a strain distribution in the pressure sensitive diaphragm. Thanks to the effect by the particular shape of the joining portion described above, however, it is possible to substantially eliminate the zero point shift and to reduce the span change as small as possible. At least one thin wall portion, which is provided on the stationary base in addition to the joining portion, has an outer periphery which is sized to be arranged within the differential pressure sensitive diaphragm as viewed in a plan view. Thus, the thin wall portion does not deteriorate the above described functions of the joining portion, which functions act on the thick wall portion of the semiconductor chip. Even if a material different from that of the semiconductor is used for the stationary base, the thin wall portion can act as an absorber for outer strains, such as static pressure strains and thermal strains, and hence there is no possibility that the functions of the joining portion will be deteriorated. Moreover, it is possible to isolate pressure strains and thermal strains from the semiconductor chip, which strains are transmitted from the housing during application of a static pressure. Accordingly, by simply making improvements on the shape of the stationary base, the differential pressure sensor may be reduced of the zero point shift and the span change and withstand against the outer strains.

DETAILED DESCRIPTION OF THE PREFERRED EMBODIMENTS

Although multi-function differential pressure sensors are described as embodiments of the present invention hereinafter, it would be apparent for those skilled in the art from the following description to apply the present invention to mere differential pressure sensors.

Figure 1:
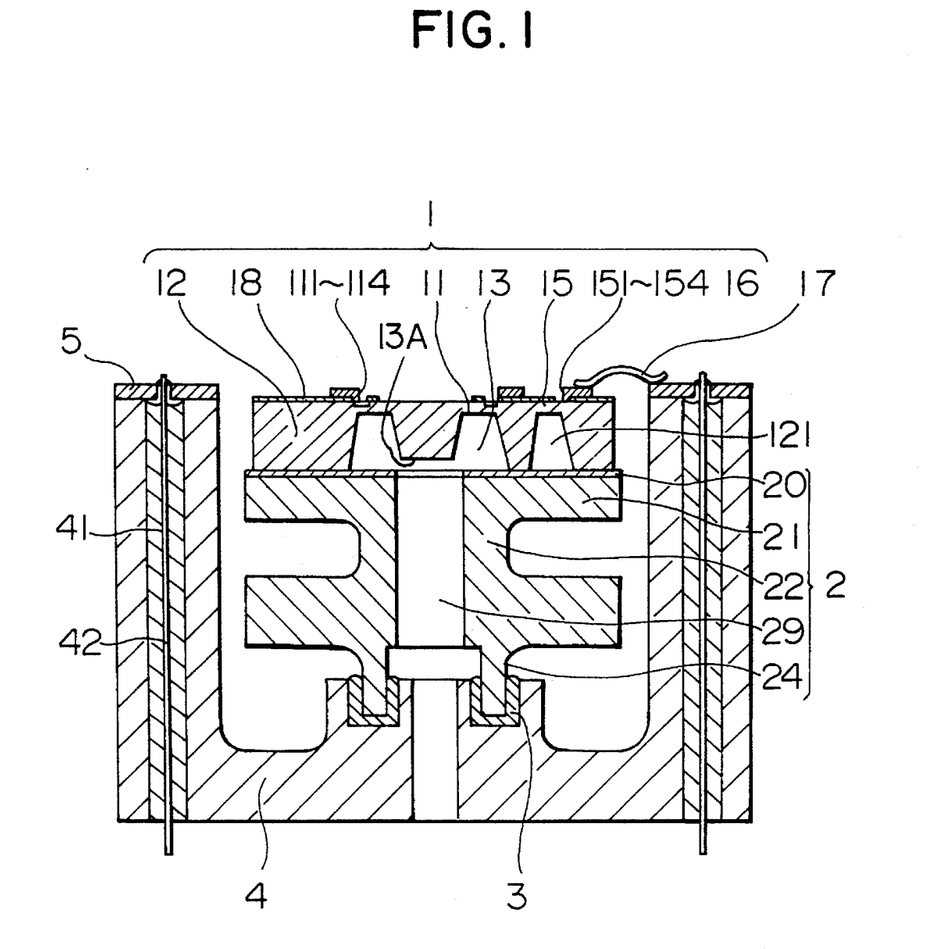
FIG. 1 is a vertical cross-sectional view of a multi-function differential pressure sensor as one embodiment of the present invention.
Figure 2:
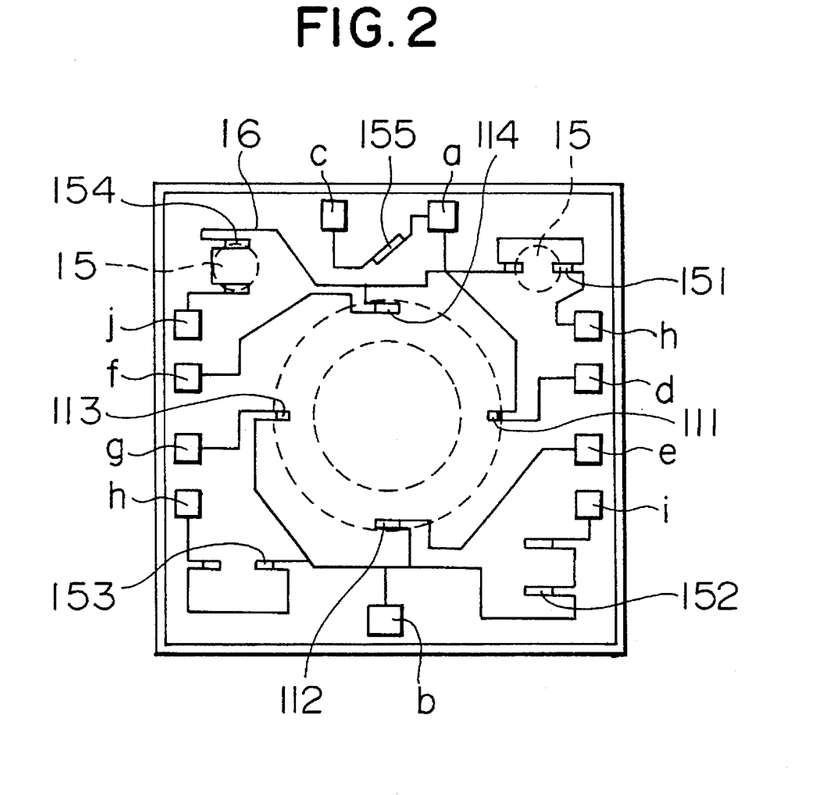
FIG. 2 is a plan view of the multi-function differential pressure sensor of FIG. 1.
Figure 3:
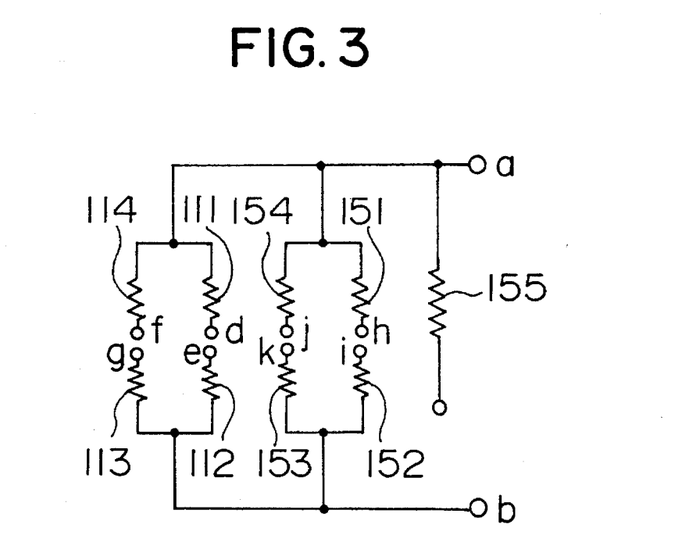
FIG. 3 is a circuit diagram of the sensor of FIG. 1.

Referring to FIGS. 1 to 3, a multi-function differential pressure sensor of the present invention will be described. In FIG. 1, the reference numeral 1 designates a multi-function differential pressure sensor chip made of a single crystal silicon. The sensor chip 1 is mounted to a housing 4 through a hollow stationary base 2. The stationary base 2 is preferably made of a ceramic, such as SiC, which is approximately equal in linear expansion coefficient to silicon, taking into consideration requirements such that: the stationary base 2 is electrically insulated from the housing 4; and thermal strains due to the difference in linear expansion coefficient between the stationary base 2 and the housing 4 are to be reduced. However, practical accuracy may be obtained even if a ceramic is not used for the stationary base 2. The stationary base 2 is provided over a junction surface thereof with a joining layer 20, the junction surface of the stationary base 2 being joined to the sensor chip 1 through the joining layer 20. The joining layer 20 is formed by the following alternative methods: the junction surface of the stationary base 2 is grazed by an oxide solder such as a low melting point glass; a metallic solder, an Au-Si alloy layer, or a thin film of Au is formed over the junction surface by sputtering or vapor depositing; and an organic or an inorganic binder is applied over the junction surface. By such a method the sensor chip 1 is joined to the stationary base 2 at a relatively low temperature with ease. Moreover, the joining layer 20 may be fairly thin for reducing adverse influences.

Differential pressure signals, static pressure signals and temperature signals are outputted from the sensor chip 1 through a lead wire 17 to a wiring board 5, from which the signals are transmitted to the outside through terminals 42 of a hermetic seal unit 41. The sensor chip 1 is a n-type single crystal on (100) plane. The sensor chip i has a circular or a polygonal recess 13 substantially centrally formed in the lower surface thereof, and the recess 13 has a shallow central bottom 13A. As a result, a circular or a polygonal thin wall portion 11 is formed in the substantially center of the sensor chip 1. The recess 13 communicates to a central through hole 29 of the stationary base 2, so that a pressure is introduced from the outside to the recess 13 through the hole 29. A differential pressure is measured between the pressure in the recess 13 and a pressure applied to the upper surface of the sensor chip 1. With such a construction the thin wall portion 11 serves as a strain producing body which is sensitive to differential pressure, and functions as a pressure sensitive diaphragm for detecting differential pressure. On the upper surface of the differential pressure sensitive diaphragm 11 there is formed p-type resistors (gauge resistors) 111 to 114 in <110> axis direction by thermal diffusion or ion implantation so that the p-type resistors are parallel with or perpendicular to crystal axes. The resistors 111 to 114 are arranged in the vicinity of portions where radial strains which are produced in the differential pressure sensitive diaphragm 11 during application of a differential pressure become maximum. Fairly large differential signals can be obtained by arranging resistors 111 and 113 in the radial direction and resistors 112 and 114 in tangential directions of the circular diaphragm 11, and by connecting the resistors 111 to 114 as shown in FIG. 3. The differential pressure sensitive diaphragm 11 is formed by anisotropic wet etching or dry etching, and the shape and the thickness of the differential pressure sensitive diaphragm 11 are set according to a predetermined differential pressure to which the differential pressure sensitive diaphragm 11 must be sensitive.

The resistors 111 to 114 are subjected to strains generated by differential pressure between pressures in the upper surface of the differential pressure sensitive diaphragm 11 and the recess 13, and change in resistance by a piezoelectric resistance effect. Thus, the circuit shown in FIG. 3 enables signals, representing the differential pressure, to be outputted from the terminals d to g.

The resistors 111 to 114 become responsive even if pressures applied to the opposite surfaces of the differential pressure sensitive diaphragm 11 are equal (static pressure state) or when the differential pressure sensitive diaphragm 11 changes in temperature. As a result, outputs of the resistors 111 to 114 change. An output change due to static pressure is called a zero point shift according to static pressure, while an output change caused by a temperature change is called a zero point shift according to a temperature change. A zero point shift according to a temperature change is caused since the resistors 111 to 114 are not constant in resistance and the resistance of each of the resistors is a function of temperature. Compensation of the zero point shifts may be made with ease since the relationship between outputs of the temperature sensor and the differential pressure sensor are exactly given. A zero point shift during application of static pressure is caused due to strains produced by structural members, such as the stationary base 2 and the housing 4, except the sensor chip 1. As in the zero point shift due to temperature change, the relationship between the zero point shift of the differential pressure sensor and the outputs of the static pressure sensor during static pressure application may be stored as information, and this zero point shift during static pressure application can be relatively easily compensated on the basis of the information. Furthermore, the differential pressure sensitivity of the differential pressure sensor changes as well as the zero point shift during application of static pressure, and is called a span change. As shown in FIG. 1, the sensor chip 1 has a thick wall portion 12, through which the sensor chip 1 is mounted to the stationary base 2 attached to the housing 4. During application of static pressure strains are produced according to differences in shape and inner diameter of the thick wall portion 12 in the thick wall portion 12. The strains are transmitted to the differential pressure sensitive diaphragm 11, and hence the differential pressure resistors 111 to 114 are changed in resistance. The strains reach to 5 to 50% of the maximum strain which is produced in the differential pressure sensitive diaphragm 11 in differential pressure measurement. When in such a high strain state, a differential pressure is produced between the opposite surfaces of the differential pressure sensitive diaphragm 11, the differential pressure sensitive diaphragm 11 is deformed according to the differential pressure, and thus large changes are produced in the resistors 111 to 114. During this process of deformation, large uniform static pressure strains previously described are added, and therefore the strain distribution of the differential pressure sensitive diaphragm 1 is different from a strain distribution under atmospheric pressure (static pressure=zero). That is, the outputs of the differential pressure sensor under atmospheric pressure and under a static pressure are different. It is presumed that, as already described, this change in output (span change) is produced when the sensor chip 1 is placed alone. On the other hand, it is presumed that any zero point shift is not produced because of uniform strain distribution. Additional components, such as the stationary base, must be provided for mounting the sensor chip 1, and thus the span change becomes larger since the sensor chip 1 undergoes influences of strains during application of a static pressure.

A zero point shift and a span change of the differential pressure sensor, which is a main strain sensor of the multi-function differential pressure sensor, provide large problems in differential pressure measurement. Particularly, a span change raises an important problem. This is because a span change is most closely related to the accuracy of the differential pressure measurement, and considerably influences the control accuracy of the plant. Recently, differential pressure meters for low differential pressure have been widely adopted. As a differential pressure sensor the differential pressure sensitive diaphragm 11 must be reduced in thickness for enhancing sensitivity thereof but this enlarges a change in span, with the result that it is hard to improve the sensor in sensitivity of differential pressure.

To overcome these problems, conventionally a static pressure sensor as an auxiliary sensor is mounted on the sensor chip, and signals from the static pressure sensor are used to compensate for a zero point shift and a span change of the differential pressure sensor. However, such a solution provides the following significant problem. Particularly, in a multi-function sensor, which uses a difference in Young's modulus from the stationary base 2, excessive bending strains are produced in the thick wall portion 12 to produce static pressure signals. These bending strains are transmitted to the differential pressure sensitive diaphragm 11, and provide large interference with outputs of the differential pressure sensor. Thus, it is necessary to determine the input-output relationships of the differential pressure sensor about temperature, static pressure and differential pressure. The amount of information to determine the input-output relationships is extremely large. Furthermore, in the process of obtaining the information, it is necessary to collect information of the input-output characteristic of the differential pressure sensor, while temperature, static pressure and differential pressure are changed. Regarding a method and device of collecting such information, there is not any convenient proposal, and therefore this causes an additional step to be given to the process of fabrication of the sensor.

More specifically, in application of a static pressure the static pressure sensor produces a considerable effect to compensate the zero point and span shifts of the differential pressure sensor which is a main strain sensor of the multi-function differential pressure sensor, while on the other hand a more complicated fabrication method and compensation method are needed since the excessive strains are produced in the pressure sensitive diaphragm of the differential pressure sensor. Moreover, functions of the multi-function differential pressure sensor are not sufficiently performed. To solve these problems in this embodiment, the shape of the stationary base is improved, so that the zero point shift and the span change of the differential pressure sensor are reduced in a hardware manner and the sensor is enhanced in characteristics without any compensation. By reducing the zero point shift and the span change, the static pressure sensor may be used as a line pressure sensor.

In FIGS. 1 and 2, the sensor chip 1 has at least one temperature sensitive resistor 155 formed in the thick wall portion 12 away from the differential pressure sensitive diaphragm 11. The temperature sensitive resistor 155 is a p-type resistor which is oriented in <100> axis and exhibits a minimum sensitivity of a piezoelectric resistance coefficient in (100) plane, and is not sensitive to a differential pressure or a static pressure. This resistor 155 is formed to have a predetermined resistance according to the same process as in the differential pressure resistors 111 to 114.

As the static pressure sensor which is the other auxiliary sensor, resistors 151 to 154 are formed in the thick wall portion 12 of the sensor chip 1 in parallel with or perpendicular to the same crystal axis direction as the differential pressure resistor similarly with the temperature sensitive resistor 155. Among the resistors 151 to 154, the resistors 151 and 154 are formed on one of the opposite surfaces of the thin wall portion 15 formed in the thick wall portion 12 of the sensor chip 1. The thin wall portion 15 has a recess 121 formed in the other surface thereof, and the recess 121 is closed to form a chamber when the thin wall portion 15 is joined to one surface of the stationary base 2. This chamber serves as a reference chamber when a static pressure is applied whereas the thin wall portion 15 serves as a static pressure sensitive diaphragm. The resistors 151 and 154 on the thin wall portion 15 are capable of producing a large change in resistance as in the resistor on the differential pressure sensitive diaphragm 11. On the other hand, the two resistors 152 and 153 are formed on the thick wall portion 12 of the sensor chip 1, and therefore does not substantially change in application of a static pressure. These resistors 151 to 154 are connected to form a bridge as shown in FIG. 3, and signals are outputted from terminals h to k. In this embodiment, the bridge is a two active gauge as already described, and outputs sufficiently large as outputs of a line pressure sensor are provided although the outputs are small as compared to outputs of the differential pressure sensor.

On the other surfaces of the sensor chip 1, there are formed a protection coating 18 for protecting the differential pressure, static pressure and temperature resistors, an aluminum wiring 16 connecting each resistor as in FIG. 3, and bonding pads a to k. The protection coating 18 is formed over the resistors and the thick wall portion of the sensor chip 1 whereas it is not provided over the differential pressure sensitive diaphragm 11. This is made to remove any influence of thermal strain due to difference in material between the protection coating 18 and the sensor chip 1 when the temperature changes. The thinner the differential pressure sensitive diaphragm 11 (small differential pressure sensor) is, the larger the effect of this feature becomes.

Figure 4A:
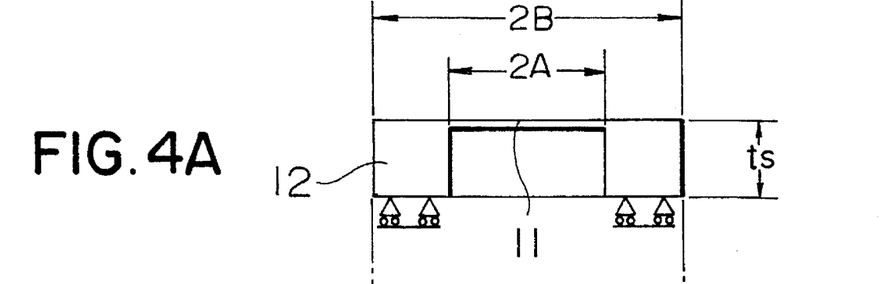
FIGS. 4A to 4D are diagrams for illustrating the principle of the present invention.
Figure 4B:
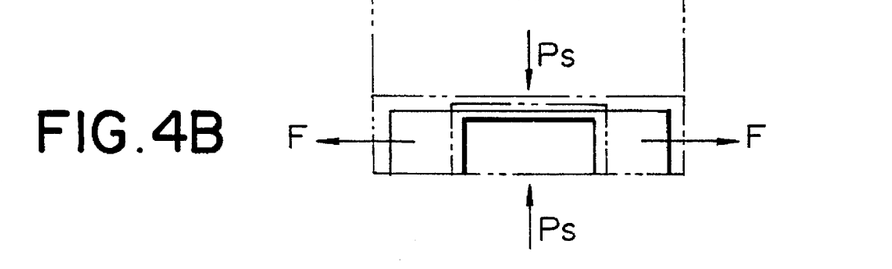

FIGS. 4A to 4D are schematic illustrations of the principle of the multi-function differential pressure sensor chip 1 in which under a static pressure the zero point shift and the span change are reduced. FIG. 4A is a schematic diagram of the sensor chip 1 in a no load state. FIG. 4B illustrates a shape of the sensor chip 1 in a static pressure application. In application of a static pressure, the pipe shape (outer diameter 2B, inner diameter 2A) of the thick wall portion 12 of the sensor chip 1 causes the sensor chip 1 to inwardly deform whereas the static pressure from the upper surface of the thick wall portion 12 downwardly deforms the sensor chip 1. The deformed state is shown by the solid line in FIG. 4B. In this event, uniform strains which correspond to the static pressure are generated in the differential pressure sensitive diaphragm 11 of the sensor chip 1 due to the difference in strain. When a differential pressure is applied in this strained state, the differential pressure sensitive diaphragm is subjected to a differential pressure strain on the basis of the static pressure strain. This static pressure strain provide a large influence on the generation of the differential pressure strain, and is therefore different from strains generated due to only differential pressure under atmospheric pressure (static pressure=0). Therefore, the span changes under generation of the static pressure. In the state of FIG. 4B (static pressure=Ps and differential pressure=0), uniform static strains are generated in both the differential pressure sensitive diaphragm 11 and thick wall portion 12, and therefore no change at the zero point is produced.

Figure 4C:
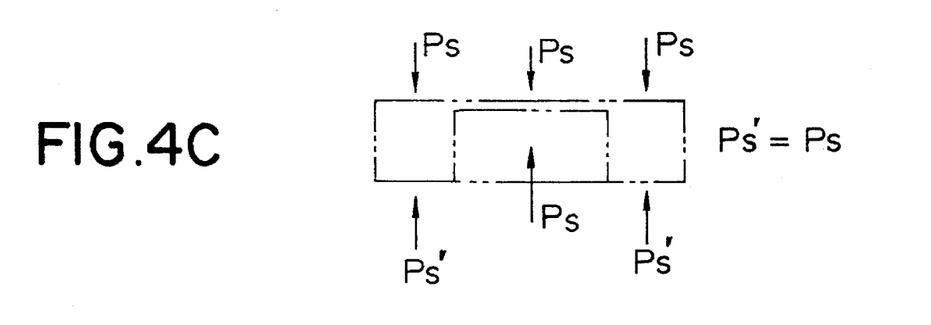
Figure 4D:
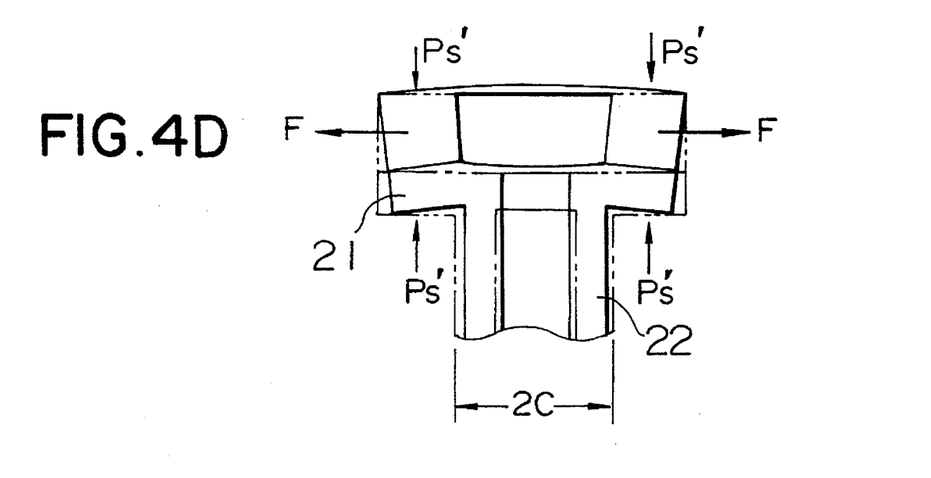

To remove shifts in the zero point and the span at a static pressure, as shown in FIG. 4B, a uniform force F is applied to the thick wall portion 12 of the sensor chip 1 while, as shown in FIG. 4C, the sensor chip 1 is returned to a shape of the dots-and-dash lines (the original shape as shown in FIG. 4A) in a parallel manner. In this manner, there are no shifts in the zero point and the span. This tensile force F can be generated due to Poisson effect if a static pressure Ps' shown in FIG. 4C is applied to the joining surface of the sensor chip 1 to the stationary base 2. Generally, the magnitude of the Ps' is equal to the magnitude of the static pressure Ps, and in other words, the thick wall portion 12 of the sensor chip 1 is placed in a static pressure state. In this embodiment, the other surface of the joining portion 21 of the stationary base 2 is subjected to the static pressure Ps (FIG. 4D), the other surface being opposite to the surface of the joining portion joined to the sensor chip 1. Thus, the thick wall portion 12 of the sensor chip 1 May be held in a static pressure state. This static pressure state may be sufficiently held by keeping the area of the thick wall portion of the sensor chip 1. It is preferable that the thickness of the thick wall portion is as thin as possible but a predetermined thickness is required from the point of strength.

The force F can be generated according to materials used in the sensor chip 1 and the stationary base 2 although the magnitude thereof is small as compared to Poisson effect at the static pressure previously described. For example, when a material which is smaller in Young's modulus than the material of the sensor chip 1 is used for the stationary base 2 with a thickness of the sensor chip 1 at maximum, a difference in strain is generated between the thick wall portion 12 of the sensor chip 1 and the joining portion of the stationary base 2. This difference in strain causes a positive bending strain to be produced on the upper surface of the thick wall portion 12. This bending strain functions as a tensile force pulling the differential pressure sensitive diaphragm 11 of the sensor chip 1 outwardly. On the contrary, when a material which is larger in Young's modulus than the material of the sensor chip 1 is used in the stationary base 2 with a thickness small as compared to the thickness in the previous case, the bending strain serves as a force pulling the differential pressure sensitive diaphragm 11 of the sensor chip 1 outwardly.

The other surface of the stationary base 2 serves as a joining surface to mount the sensor chip 1 to the housing 4. The stationary base 2 has at least one thin wall portion 22 between the joining portion and a portion (which places the sensor chip 1 in the static pressure state) having a surface joined to the thick wall portion 12 of the sensor chip 1. As viewed from above the sensor chip 1, this thin wall portion 22 is located within the circular thick wall portion 12 of the sensor chip 1, that is, within the inner periphery (diameter= 2A) of the differential pressure sensitive diaphragm 11 of the sensor chip 1 ($2C \leq 2A$). In this embodiment, the thin wall portion 22 serves as a portion which absorbs thermal strains from the housing 4 and pressure strains due to application of a static pressure, and therefore the static pressure state which is formed by the thick wall portion 12 of the sensor chip 1 and the joining portion 21 of the stationary base 2 is not disturbed.

As already described, the joining portion 21 of the stationary base 2 is formed so that: as viewed from above the sensor chip 1, the joining portion 21 is larger in area than the thick wall portion 12 of the sensor chip 1; and the joining portion 21 has a thickness not larger than the thick wall portion 12 of the sensor chip 1. With such a configuration of the joining portion 21 the thick wall portion 12 of the sensor chip 1 may be held in a static pressure state, and therefore shifts in the zero point and the span are made null or as small as possible. Moreover, the stationary base 2 has at least one thin wall portion 22 formed in it so that the thin wall portion 22 is located within the differential pressure sensitive diaphragm 11 of the sensor chip 1 as viewed from above the sensor chip 1 or in a plan view. This enables the static pressure state to be positively held and the thin wall portion 22 to function to absorb thermal strains and pressure trains due to application of the static pressure. This function does not provide any influences of thermal strains and pressure strains due to environmental factors to the differential pressure sensitive diaphragm 11 of the sensor chip 1. In the multi-function differential pressure sensor of such a structure, any load is not applied to the static pressure sensor which is an auxiliary sensor in addition to the advantage that shifts in the zero point and the span are made null or as small as possible. Thus, the static pressure sensor may be effectively used as a line pressure sensor.

Figure 5A:
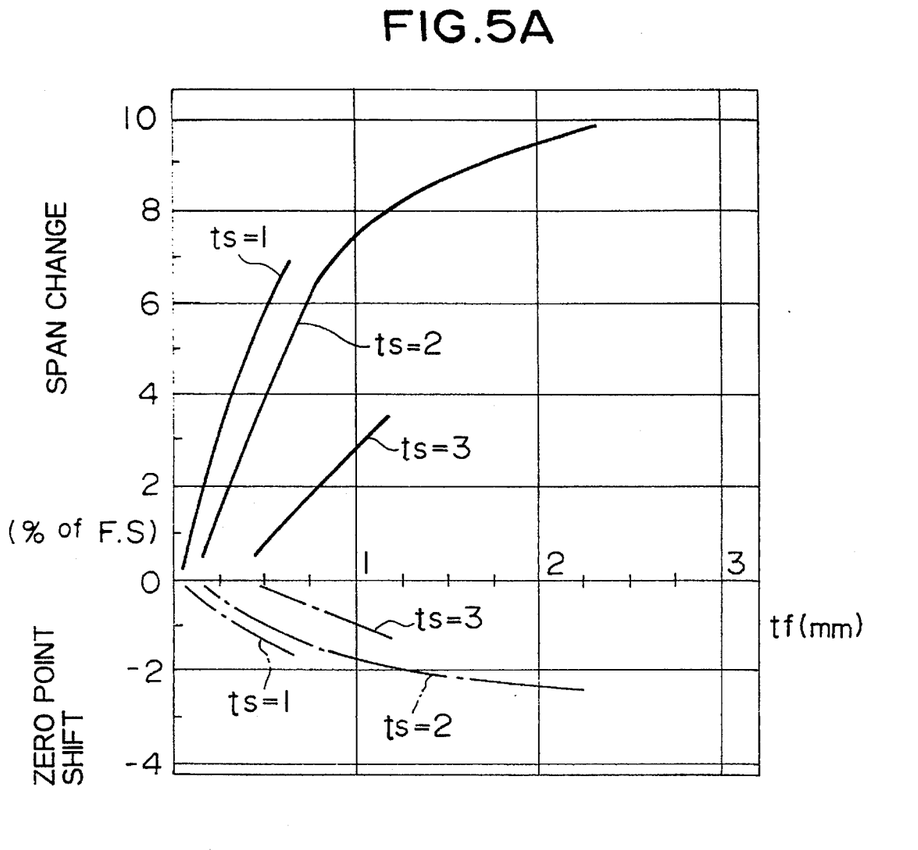
FIG. 5A is a characteristic graph of sensors according to the present invention, in which the joining portions of the sensors are changed in thickness.
Figure 6A:
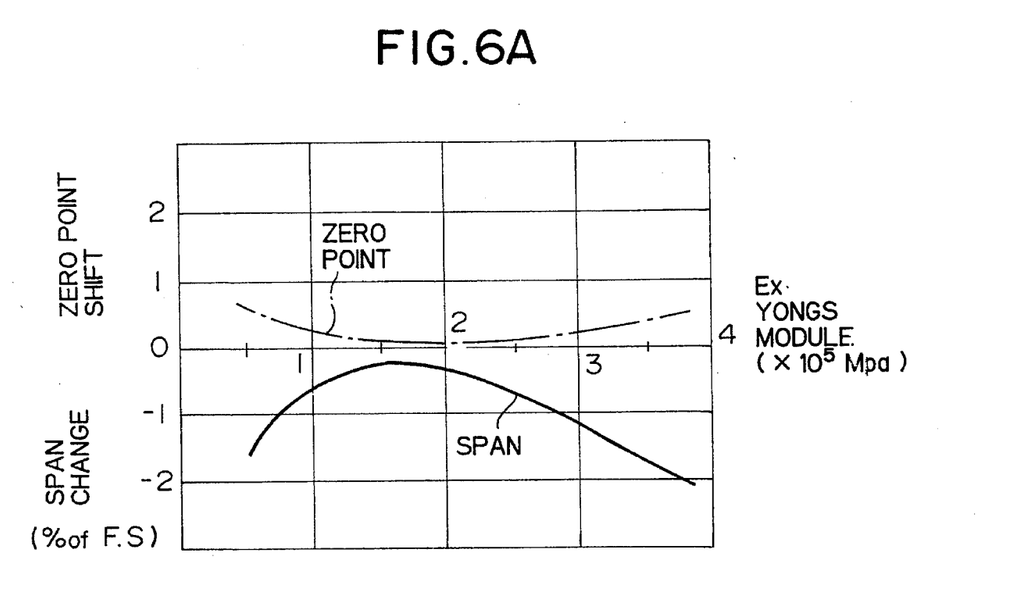
FIG. 6A is a characteristic graph of sensors according to the present invention, in which the sensors are changed in Young's modulus.

FIGS. 5A and 6A are characteristic graphs of modified multi-function differential pressure sensors which were fabricated according to the previously described principle of the present invention. The differential pressure sensors are for low differential pressure zone, and the differential pressure sensitive diaphragm 11 of each sensors was very thin (the thickness of the diaphragm plate was about 10 μm and the diameter thereof was about 4 mm).

Figure 5B:
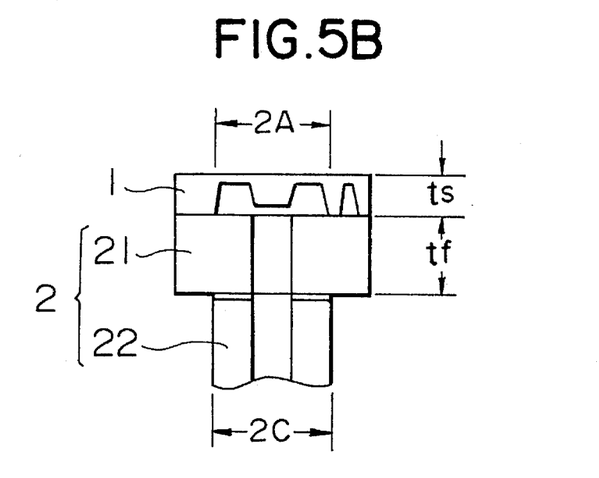
FIG. 5B is a diagrammatic fragmental vertical cross-sectional view of the sensors of FIG. 5A.

In the sensor of FIGS. 5A and 5B, the stationary base had a two layer structure; it had a joining portion 21 and a thin wall portion 22. The zero point shift and the span change was measured as the thickness tf of the joining portion 21 and the thickness ts of the sensor chip 1 were changed. From FIG. 5A, it is apparent that the zero point and the span largely changed according to the thickness ts of the sensor chip 1 and the thickness tf of the joining portion 21 of the stationary base 2, but such changes became much smaller by making the thickness tf of the joining portion 21 of the stationary base 2 small as compared to the thickness ts of the thick wall portion of the sensor chip 1. The joining portion 21 used a material of which Young's modulus is rather smaller than the material of the sensor chip 1 whereas the thin wall portion 22 used a material which was large in Young's modulus as compared to the material of the sensor chip 1.

Figure 6B:
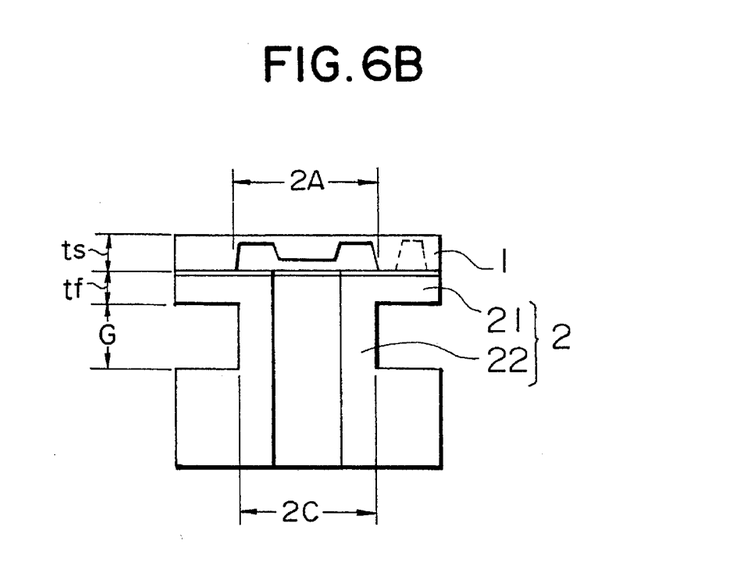
FIG. 6B is a diagrammatic fragmental vertical cross-sectional view of the sensors of FIG. 6A.

In the stationary base 2 of the sensor of FIGS. 6A and 6B, the joining portion 21 and the thin wall portion 22 were integrally formed, and the thickness tf of the joining portion 21<the thickness ts of the sensor chip 1 while the outer diameter 2C of the thin wall portion 22<the inner diameter 2A of the differential pressure sensitive diaphragm 11 with the length G thereof equal to the thickness tf of the joining portion 21. In the test, the zero point shift and the change of the span were measured as the Young's modulus of the stationary base 2 was varied in a range from $0.5 \times 10^5$ to $4 \times 10^5$ MPa. The thickness of the differential pressure sensitive diaphragm 11 was equal to that of the differential pressure sensitive diaphragm 11 of FIGS. 5A and 5B. As apparent from the FIG. 5A, the zero point shift and the span change were very small as compared to the changes of the Young's modulus and the absolute values thereof were also very small.

From FIGS. 5A and 6A it was shown that each of the multi-function differential pressure sensors constructed according to the principle of the present invention was excellent in characteristic of the differential pressure sensor as the main strain sensor, and that the material of the stationary base 2 had a wide selection range.

In the embodiment of FIG. 1, the stationary base 2 adopts not only a structure based on the principle previously described but also a shape which takes the joining property to the housing 4 and improvement in characteristics into consideration. In the case where the housing 4, the joining layer 3, and the stationary base 2 are different in substance, various strains, such as joining strain, temperature strain, and static pressure strain, are generated during joining, changing of temperature and application of static pressure. To remove influences of various strains by absorbing the latter, the stationary base 2 is provided in the vicinity of the joining portion thereof to the housing 4 with the thin wall portion 24, which serves as an insulating portion or an absorber of the strains.

Figure 7A:
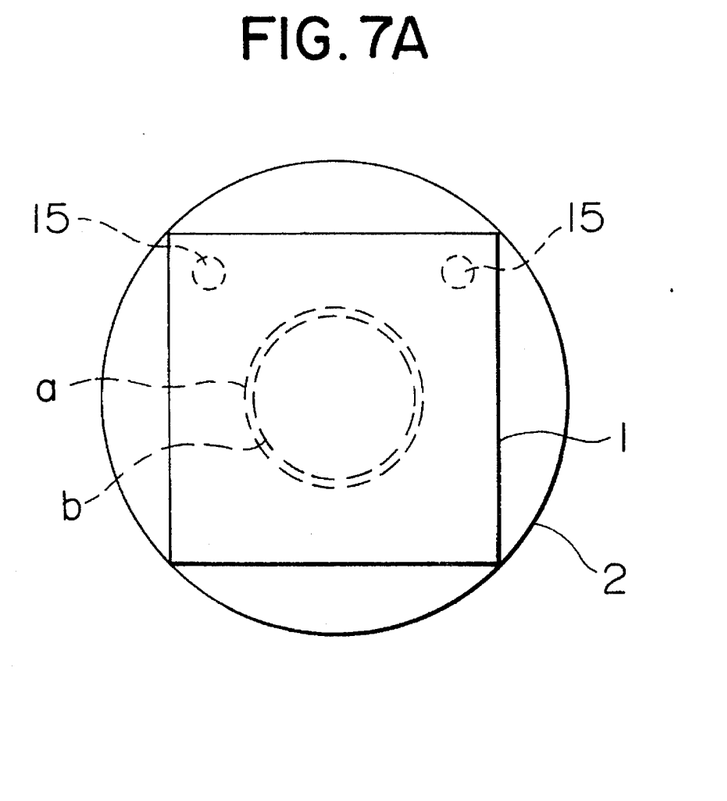
FIGS. 7A and 7B are plan and axial cross-sectional views of a multi-function differential pressure sensor as another embodiment of the present invention.
Figure 7B:
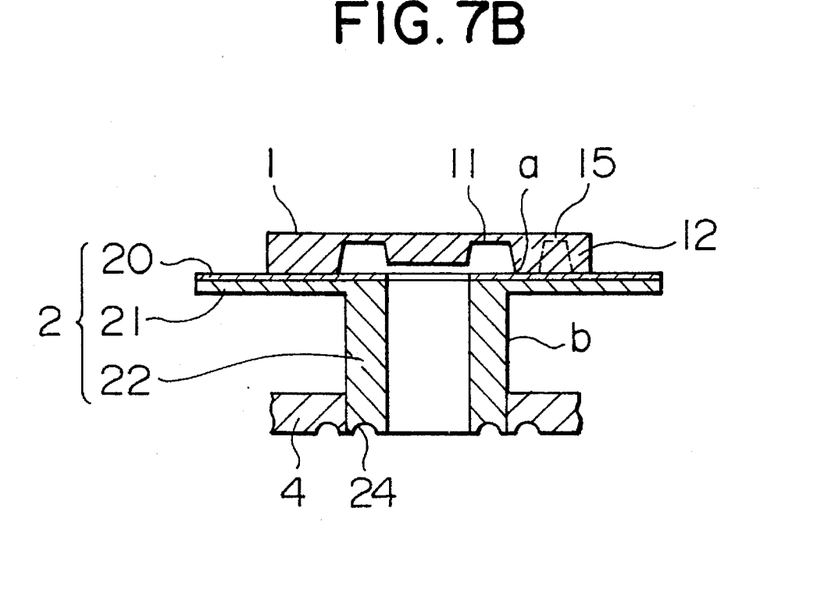

FIGS. 7A and 7B illustrate another embodiment of the present invention. In this embodiment, the stationary base 2 uses a Fe-Ni alloy which is considerably equal in both Young's modulus and linear expansion coefficient to the sensor chip 1, and the thin wall portion 22 of the stationary base 2 is integrally formed with a joining strain absorption portion 24. The joining layer 20 of this sensor is made of an oxide solder, such as high insulation, low melting point glass, or a ceramic. The housing 4 and the base 2 are joined through the joining strain absorption portion 24 by argon arc welding or plasma welding. With such a construction, the advantages of the present invention will be achieved, and moreover this embodiment facilitates obtaining of the material of and fabrication of the stationary base 2 and is excellent in economy.

Figure 8A:
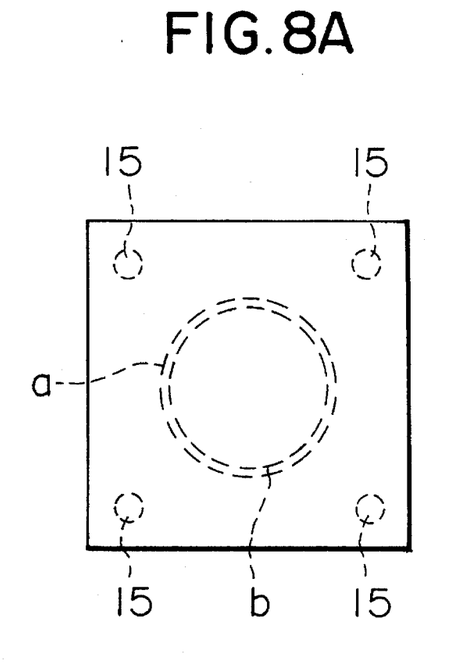
FIGS. 8A and 8B are plan view and axial cross-sectional views of a multi-function differential pressure sensor as still another embodiment of the present invention.
Figure 8B:
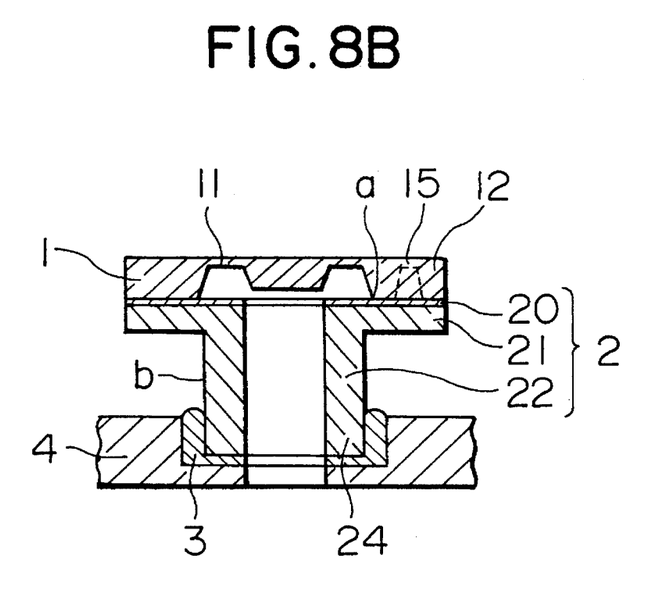

Still another embodiment of the present invention is illustrated in FIGS. 8A and 8B. In this embodiment, the stationary base 2 uses silicon, which is also used for the sensor chip 1, or a borosilicate glass which is approximately equal in linear expansion coefficient to the sensor chip 1. Furthermore, a strain absorption portion is integrally formed with the thin wall portion 22 of the stationary base 2. The thick wall portion 12 of the sensor chip 1 is provided with four static pressure sensitive diaphragms 15, and by these diaphragms 15 it is possible for the static sensor to produce outputs of two times as large as outputs of the static sensors of the preceding embodiments. Thus, process pressure signals having a relatively high S/N ratio can be obtained. When the stationary base 2 is made of a borosilicate glass, the stationary base 2 is joined to the sensor chip 1 without any joining layer 20 and any strain by anodic oxide joining process, and fabrication of the sensor becomes easy and the sensor is enhanced in economy. In the case where the stationary base 2 is made of a silicon, a several tens μm thick oxide film, high insulation oxide solder layer or ceramic solder layer is required to be interposed between the sensor chip 1 and the joining portion 21 of the stationary base 2 for electrical insulation or joining. In this case, the fabrication of the sensor is achieved with ease according to the same process as the conventional semiconductor process. Moreover, the stationary base 2 is equal in material characteristic, particularly linear expansion coefficient, to the sensor chip 1, and therefore a sensor with an excellent temperature characteristic can be produced.

Figure 9A:
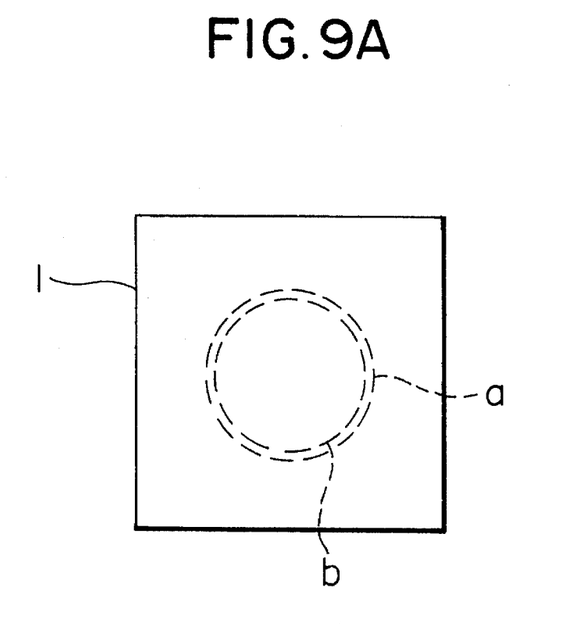
FIGS. 9A and 9B are plan and axial cross-sectional views of a multi-function differential pressure sensor as another embodiment of the present invention.
Figure 9B:
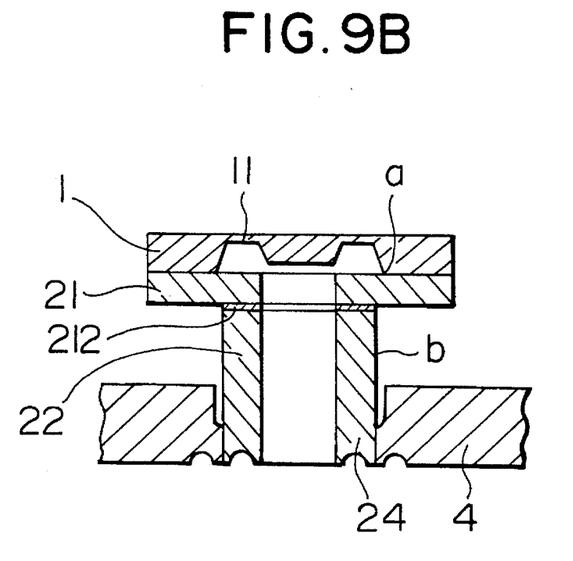

FIGS. 9A and 9B show another embodiment of the present invention, in which the joining portion 21 and the thin all portion 22 of the stationary base 2 are made of different material according to functions thereof. The thin wall portion 22 is provided with a joining strain absorption portion 24. As the material of the joining portion 21, a borosilicate glass is used, and a metallic material such as a Fe-Ni alloy is used for the thin wall portion 22. The sensor chip 1 of this embodiment is provided in the thick wall portion 12 with no static pressure sensitive diaphragm although static pressure resistors are provided. This embodiment does not deteriorate the advantages of the present invention, and moreover has an advantageous effect such that the joining portion 21 of the stationary base 2 may be joined to the sensor chip 1 by anodic oxide joining process without strains and any joining layer. Furthermore, the sensor chip 1 and the joining portion 21 of the stationary base 2 are totally joined on the basis of a substrate (in the unit of a wafer). In the embodiment, the sensor chip 1 and the stationary base 2 are considerably different in Young's modulus, and bending strains due to differences in strain are generated in the upper surface of the sensor chip i during application of a static pressure. This enables static pressure signals to be produced without any static pressure sensitive diaphragm, and furthermore it is not necessary to pay any attention to the strength of the static pressure sensitive diaphragm (maximum working pressure). Therefore, sensors which are fairly high in maximum working pressure can be provided and reduction in size of the sensors can be achieved. When the thin wall portion 22 uses a Fe-Ni alloy which is considerably equal in linear expansion coefficient to the sensor chip 1, the thin wall portion 22 may be joined to the joining portion 21 by anodic oxide joining process, and easily joined to the housing 4 through the joining strain absorption portion 24 by argon arc welding or plasma welding. In the case where the thin wall portion 22 uses a metallic material other than a Fe-Ni alloy, a joining layer 212 may be provided between the thin wall portion 22 and the joining portion 21. The joining layer may be made of an oxide solder, such as a soft low melting point glass, an organic or an inorganic binder, or a metallic solder. The thin wall portion 22 may be welded to the housing 4 with ease. The soft joining layer 212 is capable of absorbing pressure strains due to a static pressure and temperature strains due to a change in temperature. In this embodiment, by making the thin wall portion 22 of the stationary base 2 of a Fe metallic material, assembling of the sensors is facilitated with excellent productivity, and furthermore the sensors are excellent in economy.

Figure 10A:
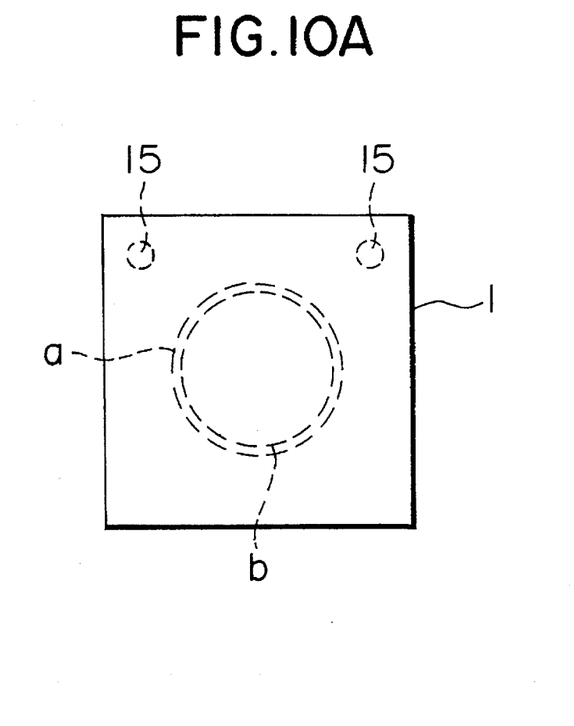
FIGS. 10A and 10B are plan view and axial cross-sectional views of a multi-function differential pressure sensor as still another embodiment of the present invention.
Figure 10B:
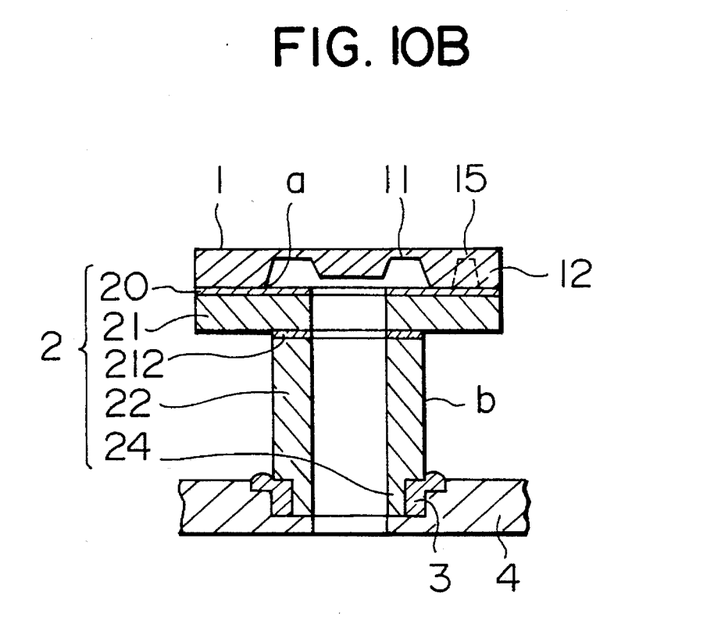

FIGS. 10A and 10B illustrate another embodiment of the present invention. In this embodiment, the joining portion 21 and the thin wall portion 22 of the stationary base 2 are made of different material according to functions thereof. The thin wall portion 22 is provided with a joining strain absorption portion 24, and the thick wall portion 12 of the sensor chip 1 has at least two static pressure sensitive diaphragm 15 formed in the thick wall portion 12. With such a construction, appropriate materials may be used for the joining portion 21 and thin wall portion 22 taking electrical insulation, joining property, adhesion property in forming of the joining layer, and shape, such as planar and tubular shapes, of the materials into account: for example, the an electrical insulation is applied to the joining portion 21; the joining portion 21 is made to be equal in linear expansion coefficient to the sensor chip 1 as much as possible; the joining portion 21 is made of a ceramic, such as SiC, or a borosilicate glass for providing a sensor excellent in temperature property; and the thin wall portion 22 is made of a ceramic, such as SiC, a borosilicate glass, or a metallic material such as a Fe-Ni alloy. When in such a combination, the thin wall portion 22 is made of a Fe-Ni alloy, the thin wall portion 22 may be joined to the housing 4 by welding, and this sensor is advantageous in assembling of the components in addition to the features previously described. On the other hand, the thin wall portion 22 may be made of a high insulation material such as a ceramic or a borosilicate glass whereas the joining portion 21 uses a material, such as silicon and a Fe-Ni alloy, which is approximately equal in linear expansion coefficient to the material of the sensor chip 1. Various kinds of solders or binders as previously described in the preceding embodiments may be used in appropriate combination to the joining layers 20, 212 and 3. In addition to the advantageous effects of the present invention, the sensor of this embodiment provides advantages such that various kinds of materials may be used, and assembling and fabrication of the sensor are facilitated.

Figure 11A:
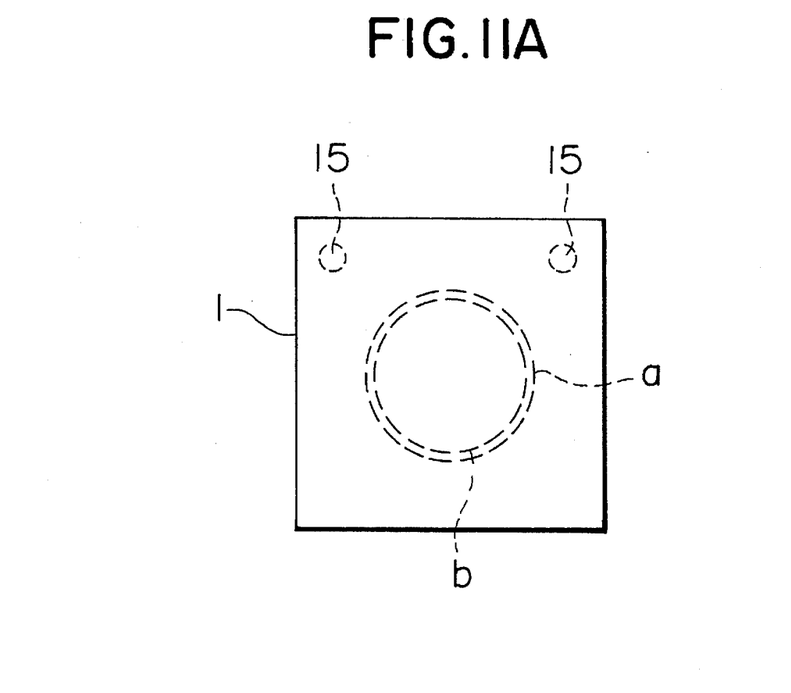
FIGS. 11A and 11B are plan and axial cross-sectional views of a multi-function differential pressure sensor as still another embodiment of the present invention.
Figure 11B:
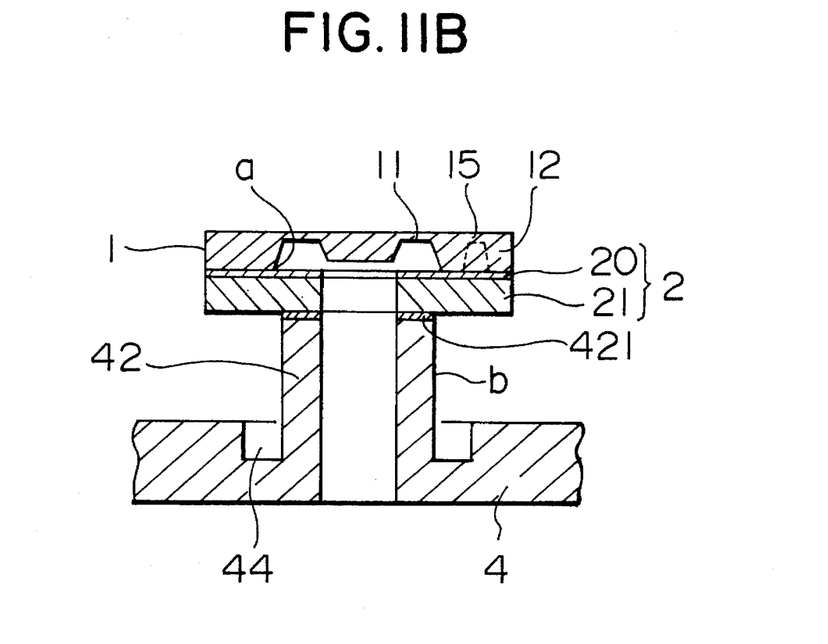

Still another embodiment of the present invention is illustrated in FIGS. 11A and 11B: at least one thin wall portion 2 which corresponds to the thin wall portion 22 of the stationary base 2 of the preceding embodiments is formed integrally with the housing 4; as already described, the outer diameter 2C of the thin wall portion 42<the inner diameter 2A of the differential pressure sensitive diaphragm 11; the thin wall portion 42 and the joining portion 21, which mounts the thick wall portion 12 of the sensor chip 1, are joined through a joining layer 421; and the thin wall portion 42 has at least one strain absorption portion 44 formed at a portion thereof remote from the joining portion 21 of the stationary base 2. In this embodiment, the housing 4 is usually made of a metallic material, and therefore a material which is highly insulative, and is approximately equal in linear expansion coefficient to the sensor chip 1 is used for the stationary base 2. Such a material may include a borosilicate glass, a ceramic, such as SiC, and a silicon substrate having an insulation coating 20. In this embodiment the thin wall portion 42 of the stationary base 2 is provided to the housing 4, and this enables reduction of consumption of the material of the sensor without deteriorating the previously described advantages of the present invention. Moreover, the sensor chip 1 and the stationary base 2 are fabricated as a sensor chip assembly separately from the housing 4, and therefore the sensor of this embodiment is advantageous in economy and is fabricated with ease.

Although the present invention is described mainly about multi-function differential pressure sensors, it may be applied to mere differential pressure sensors. In the present invention, the semiconductor chip may be any conventional chip such that no thick wall portion is provided to the central portion thereof.

What is claimed is:

1. A differential pressure sensor comprising:

a semiconductor chip formed of a single chip and having opposite first and second surfaces, said semiconductor chip including a thin wall portion and a thick wall portion formed about said thin wall portion, said thin wall portion being responsive to a difference between first and second pressures respectively applied to said first and second surfaces of said semiconductor chip;

differential pressure detection means provided on at least one surface of said semiconductor chip for detecting the difference between the first and second pressures; and a stationary base having a joining surface, another surface opposite to said joining surface and a passage, said stationary base being joined at said joining surface to said thick wall portion of said semiconductor chip to fixedly secure said semiconductor chip, said stationary base, in an area of said joining surface, being smaller in thickness in a same direction than said thick wall portion of said semiconductor chip, said passage being formed in said opposite surface of said stationary base to introduce thereto said first pressure being applied to said first surface of said semiconductor chip.

2. The sensor according to claim 1, wherein said stationary base includes a hollow portion and an outer peripheral portion surrounding said hollow portion, said joining surface of said stationary base for said semiconductor chip is formed on said outer peripheral portion, and said hollow portion is formed through said stationary base to introduce said second pressure to be applied to said semiconductor chip.

3. The sensor according to claim 1, further comprising a means arranged on said thick wall portion of said semiconductor chip for detecting a temperature.

4. A differential pressure sensor comprising:

a semiconductor chip formed of a single chip and having opposite first and second surfaces, said semiconductor chip including a thin wall portion and a thick wall portion formed about said thin wall portion, said thin wall portion being responsive to a difference between first and second pressures respectively applied to said first and second surfaces of said semiconductor chip;

differential pressure detection means provided on at least one surface of said semiconductor chip for detecting the difference between the first and second pressures; and a stationary base having a joining surface, another surface opposite to said joining surface and a passage, said stationary base being joined at said joining surface to said thick wall portion of said semiconductor chip to fixedly secure said semiconductor chip, said stationary base, in an area of said joining surface, being smaller in thickness than said thick wall portion of said semiconductor chip, said passage being formed in said opposite surface of said stationary base to introduce thereto said first pressure being applied to said first surface of said semiconductor chip, wherein said stationary base includes a hollow portion and an outer peripheral portion surrounding said hollow portion, said joining surface of said stationary base for said semiconductor, chip is formed on said outer peripheral portions, and said hollow portion is formed through said stationary base to introduce said second pressure to be applied to said semiconductor chip, wherein said stationary base further includes a thin wall portion in said outer peripheral portion, and said thin wall portion of said stationary base is smaller in outer diametrical size than said thin wall portion of said semiconductor chip and is situated such that, as viewed from above said semiconductor chip, said thin wall portion of said stationary base is within said thin wall portion of said semiconductor chip.

* * * * *